（12） United States Patent
Yu (10) Patent No.: US 8,031,064 B2
(45) Date of Patent: Oct. 4, 2011

(54) TIRE PRESSURE DETECTING APPARATUS AND TIRE PRESSURE DETECTOR IDENTIFICATION COPYING METHOD FOR THE SAME

(75) Inventor: Hung-Chih Yu, Taichung (TW)

(73) Assignee: Orange Electronic Co., Ltd., Tanzih Hsiang Taichung Hsien (TW)

( * ) Notice: Subject to any disclaimer, the term of this patent is extended or adjusted under 35 U.S.C. 154(b) by 420 days.

(21) Appl. No.: 12/283,979

(22) Filed: Sep. 17, 2008

(65) Prior Publication Data

US 2010/0066524 A1 Mar. 18, 2010

(51) Int. Cl.
*B60C 23/00* (2006.01)
(52) U.S. Cl. .......... 340/447; 340/442; 340/445; 73/146; 73/146.5
(58) Field of Classification Search .......... 340/442–449, 340/425.5, 426.3, 10.06, 10.1; 73/146, 146.2–146.5
See application file for complete search history.

(56) References Cited

U.S. PATENT DOCUMENTS

| 6,920,785 B2 * | 7/2005 | Toyofuku ........................ 73/146 |
| 6,927,679 B2 * | 8/2005 | Taguchi et al. ................ 340/442 |
| 7,137,296 B2 * | 11/2006 | Shida et al. .................. 73/146.5 |

* cited by examiner

*Primary Examiner* — Anh V La
(74) *Attorney, Agent, or Firm* — Charles E. Baxley (57) ABSTRACT

A tire pressure detecting apparatus has an identification rewriteable tire pressure detector and a setting apparatus. The tire pressure detector is securely mounted on a valve stem inside a tire of a vehicle and has a micro-processing module, a sensing module, a transmitting module and a receiving interface, where the micro-processing module has a memory unit. The setting apparatus is capable of reading or inputting an identification from a failure tire pressure detector, transmits the identification to the identification rewriteable tire pressure detector and writes the identification into the memory unit.

13 Claims, 4 Drawing Sheets

FIG.4

TIRE PRESSURE DETECTING APPARATUS AND TIRE PRESSURE DETECTOR IDENTIFICATION COPYING METHOD FOR THE SAME

BACKGROUND OF THE INVENTION

1. Field of Invention

The present invention relates to a tire pressure detecting apparatus, and more particularly to an identification rewriteable tire pressure detecting apparatus.

2. Description of the Related Art

Various Tire Pressure Monitoring Systems (TPMSs) may be applied for monitoring air pressure inside tires of a vehicle to alert a driver of abnormal tire pressure or to easily check correct tire pressures are set, and a conventional TPMS comprises a tire pressure detector connected to an inner end of a valve stem. Normally, an average lifetime of the tire pressure detectors is five years, users need to change the tire pressure detectors after the tire pressure detector is failure. However, tire pressure detectors have different installation methods depending on manufacturers of the tire pressure detectors, to request an original manufacturer for installing a new tire pressure detector is necessary but troublesome.

Figure 4:
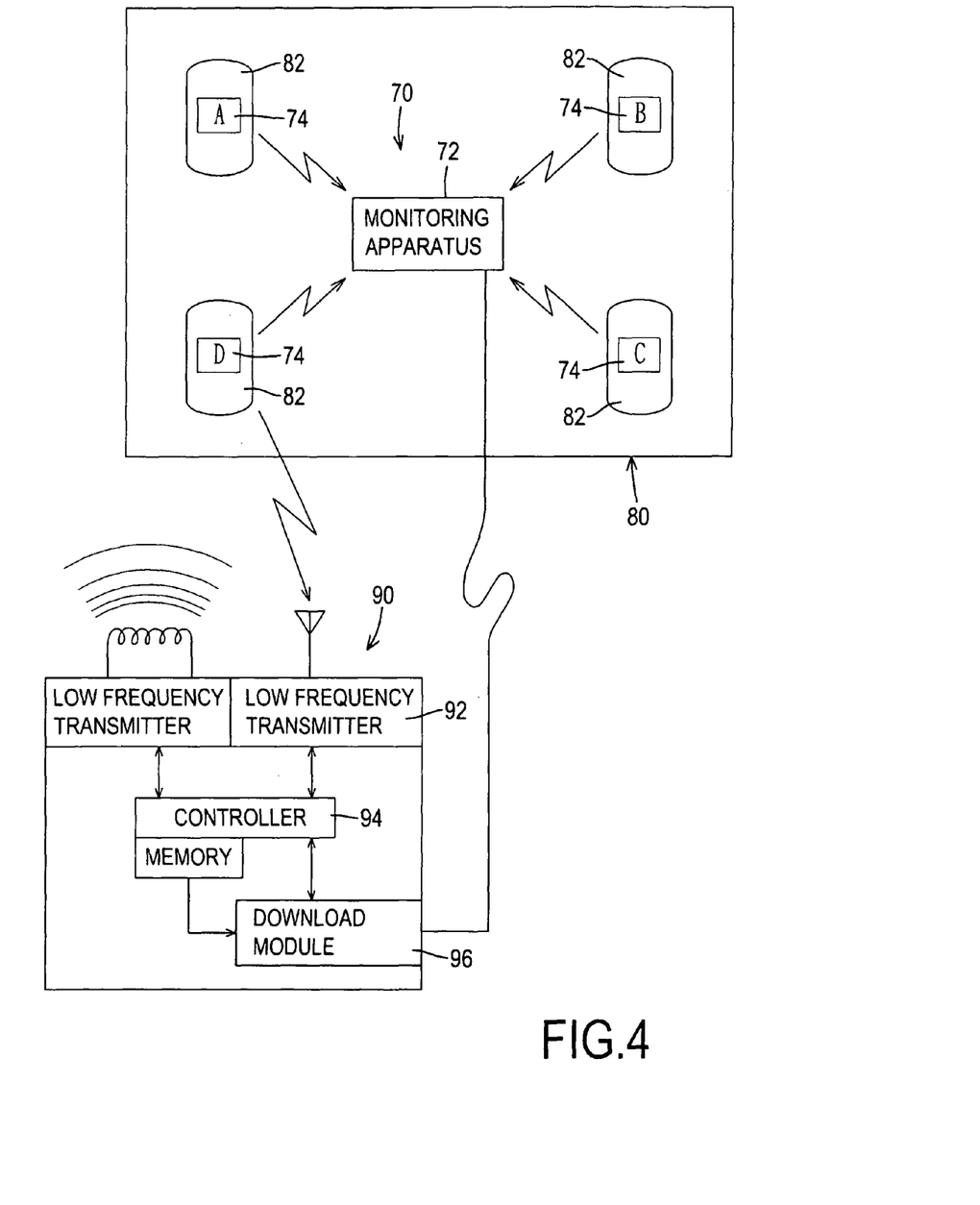
FIG. 4 is a block diagram of a tire pressure detecting system and a setting apparatus in accordance with the prior art.

For instance, FIG. 4 shows an existed tire pressure detecting system (70), the tire pressure detecting system (70) comprises a monitoring apparatus (72) and four tire pressure detectors (74). The monitoring apparatus (72) is installed inside a car (80) and the tire pressure detectors (74) are respectively installed inside four tires (82) of the car (80). The monitoring apparatus (72) continuously receives wireless signals sent from the tire pressure detectors (74). Each tire pressure detector (74) has an identification (ID) recorded therein so that the wireless signal sent by the tire pressure detector (74) may be recognized by the monitoring apparatus (72) since the wireless signal stream comprises the identification. In other words, the monitoring apparatus (72) recognizes the tire pressure detectors (74) by identifying the IDs in the received wireless signals. Hence, when one of the tire pressure detector (74) is replaced by a new one, a setting apparatus (90) is necessary for introducing a new ID of the new tire pressure detector (74) to the monitoring apparatus (72). The setting apparatus (90) has a receiving module (92), a controller (94) and a download module (96). The receiving module (92) is electronically connected to the controller (94), receives wireless signals from the tire pressure detectors (74) and sends the received wireless signals to the controller (94). The controller (92) controls the download module (96) to write the ID of the tire pressure detector (74) into the monitoring apparatus (72), thereby the monitoring apparatus (72) may start to read wireless signal after the ID is recognizable.

However, the setting apparatus (90) is only fitted with some specific tire pressure detectors (74) that have to be manufactured by the same company. Flexibility and convenience of changing the tire pressure detector (74) are not good since users have to look for specific service centers that have the setting apparatus (90) to change the tire pressure detectors (74).

The present invention provides a tire pressure detecting apparatus to obviate or mitigate the shortcoming of the conventional tire pressure detector.

SUMMARY OF THE INVENTION

The primary objective of the present invention is to provide a tire pressure detecting apparatus which is identification rewriteable thereby an new tire pressure detector can be easily replaced a failure tire pressure detector by coping the identification of the failure tire pressure detector directly.

The tire pressure detecting apparatus has an identification rewriteable tire pressure detector and a setting apparatus. The tire pressure detector is securely mounted on a valve stem inside a tire of a vehicle and has a micro-processing module, a sensing module, a transmitting module and a receiving interface, where the micro-processing module has a memory unit. The setting apparatus is capable of reading or inputting an identification from a failure tire pressure detector, transmits the identification to the identification rewriteable tire pressure detector and writes the identification into the memory unit.

Other objectives, advantages and novel features of the invention will become more apparent from the following detailed description when taken in conjunction with the accompanying drawings.

DETAILED DESCRIPTION OF THE INVENTION

Figure 1:
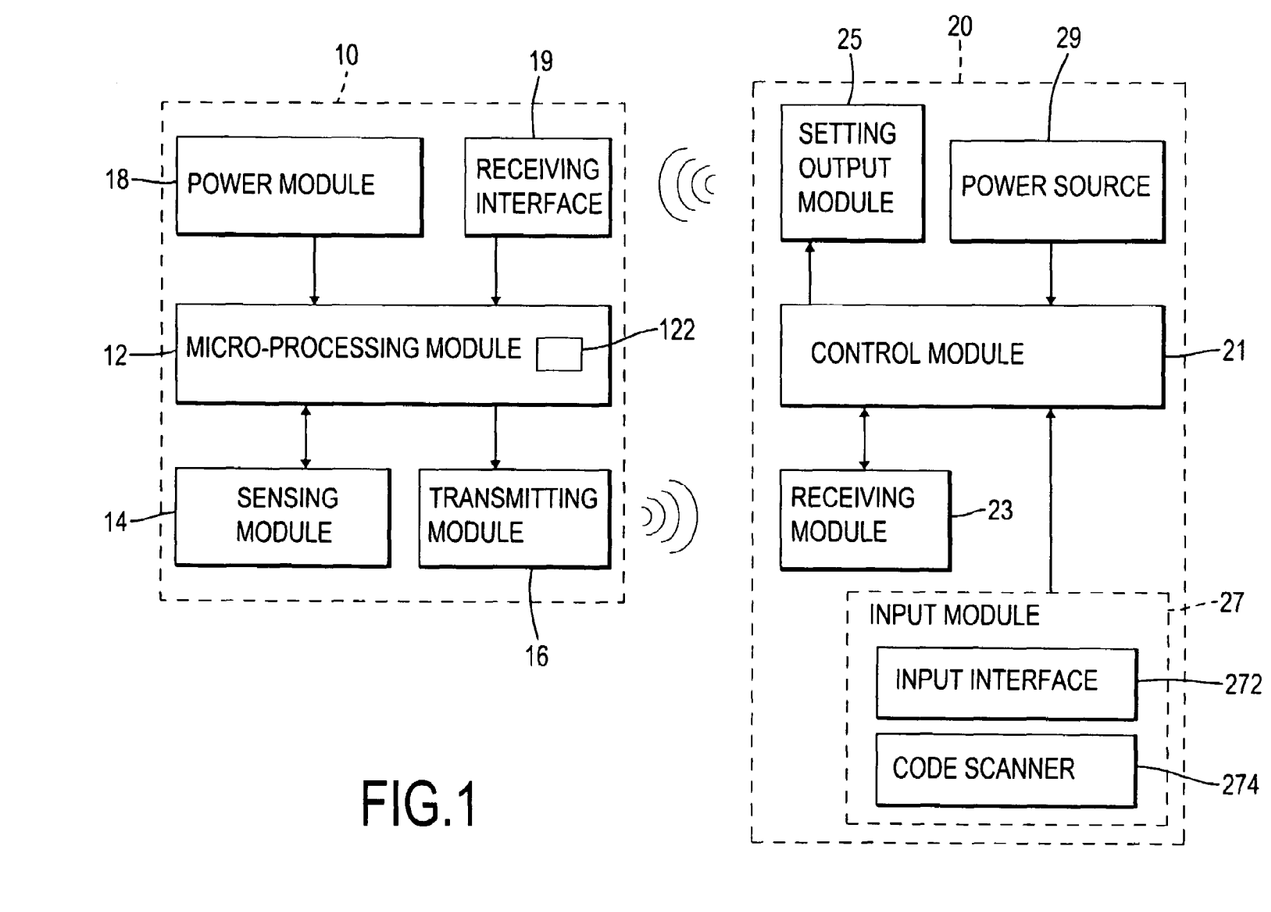
FIG. 1 is a block diagram of a tire pressure detecting apparatus in accordance with the present invention.
Figure 2:
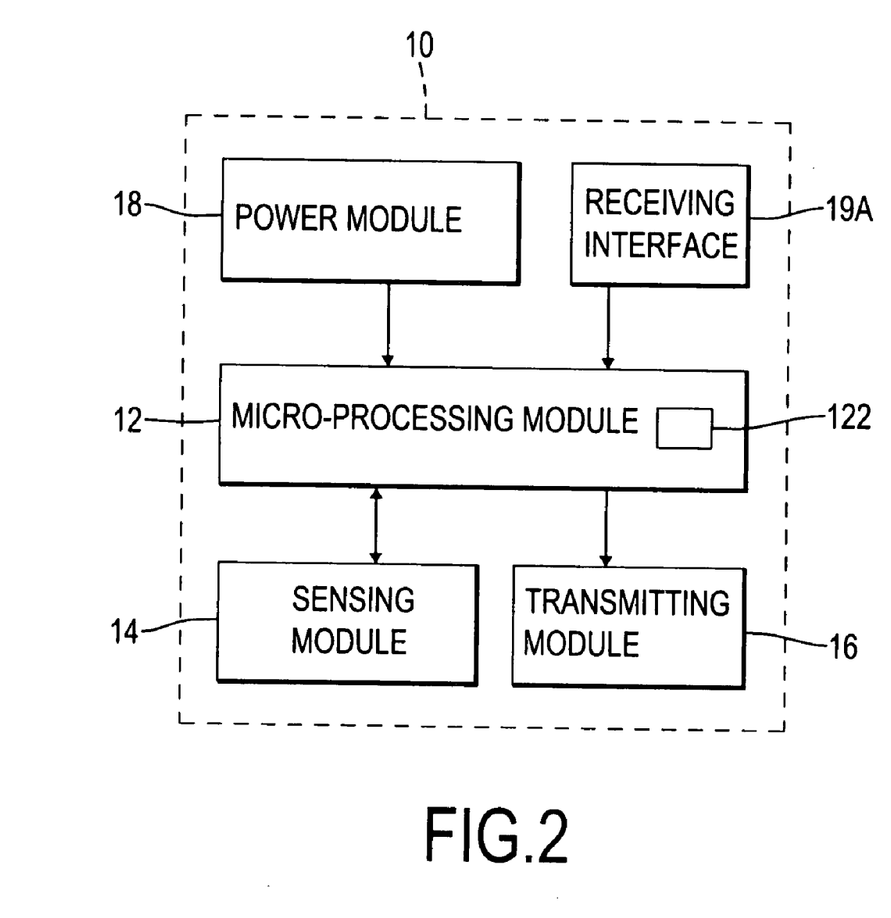
FIG. 2 is a block diagram of an identification rewriteable tire pressure detector in accordance with the present invention.

With reference to FIGS. 1 and 2, a tire pressure detecting apparatus in accordance with the present invention has an identification rewriteable tire pressure detector (10) and a setting apparatus (20).

The identification rewriteable tire pressure detector (10) is securely mounted on a valve stem inside a tire of a vehicle and has a micro-processing module (12), a sensing module (14), a transmitting module (16), a power module (18) and a receiving interface (19, 19A).

The micro-processing module (12) has a memory unit (122). The memory unit (122) is a writeable memory and may memorize a preset identification therein, where the preset identification may be an identical 8-bit integer numbered and is given when the identification rewriteable tire pressure detector (10) is manufactured. Either the memory unit (122) is empty without memorizing any preset identification therein.

The sensing module (14) is electronically connected to the micro-processing module (12) and may have a pressure-detecting unit, at least one acceleration-detecting unit, a temperature-detecting unit and/or the like. The sensing module (14) is controlled by the micro-processing module (12) to respectively detect continuously a tire pressure signal, acceleration direction signals and a tire temperature signal of the vehicle and send a detection result to the micro-processing module (12). Wherein, when two acceleration-detecting units are included, the two acceleration-detecting units may detect a turning acceleration and a tuning direction of the vehicle, where the turning acceleration and the tuning direction are calculated from the detection results of the acceleration-detecting units.

The transmitting module (16) is controlled by the micro-processing module (12) to transmit a radio frequency (RF) signal, where the RF signal comprises the detection results and may have the preset identification. The RF signal may have frequencies such as 315 MHz, 433 MHz or the like.

The power module (18) is electronically connected to the micro-processing module (12) and provides electric power to the identification rewriteable tire pressure detector (10).

The receiving interface (19, 19A) is electronically connected to the micro-processing module (12), receives an external signal, outputs the external signal to the micro-processing module (12) and may be a connector or a low frequency receiver that are respectively shown on FIG. 1 and FIG. 2. The external signal may have an external identification thereby the micro-processing module (12) receives and memorizes the external identification into the memory unit (122) to overwrite and be the preset identification that is originally memorized in the memory unit (122). The low frequency receiver receives the external signal having a low frequency relating to the frequency of the RF signal. In a preferred embodiment of the present invention, the external signal is at kilo-Hz scale such like 125 kHz and is sent from the setting apparatus (20). A reason for adopting the low frequency receiver is that the low frequency wireless signal has a lower transparency, thereby the receiving interface (19) has to be placed nearby the setting apparatus (20) when receiving the low frequency wireless signal from the source. Hence, a person may decide to receive the external signal from one particular source by adjusting a distance with the particular source.

The setting apparatus (20) communicates with the identification rewriteable tire pressure detector (10) and tire pressure detectors that are generally using a same range of frequencies and has a control module (21), a receiving module (23), a setting output module (25), an input module (27) and a power source (29).

The receiving module (23) is electronically connected to the control module (21) and receives the RF signal from the identification rewriteable tire pressure detector (10) or the tire pressure detectors that are capable of sending the RF signals. The receiving module (23) sends the received RF signal to the control module (21) thereby the control module (21) has the preset identification of the identification rewriteable tire pressure detector (10) or the tire pressure detector.

The setting output module (25) is controlled by the control module (21) to send the external signal to the receiving interface (19, 19A). Wherein, the external signal is generated by the control module (21) and may comprise the external identification that is identical to preset identification in the RF signal received from the receiving module (23). The setting output module (25) may be an outputting connector corresponding and being electronically connected to the connector (19A) or may be a wireless transmitting interface sending the external signal wirelessly to the receiving interface (19).

The input module (27) is electronically connected to the control module (21), accepts the preset identification that is keyed in or scanned in and may have an input interface (272) and a code scanner (274).

The input interface (272) is electronically connected to the control module (21), may be a dip switch, a keyboard or the like, is capable of accepting a setup by a person to input the preset identification of a failure tire pressure detector. The person may acquire the preset identification directly from the failure tire pressure detector since the preset identification is printed or listed on a surface of the tire pressure detector. The identification may be a set of integer or a barcode printed or formed on the surface of the tire pressure detector.

The code scanner (274) is electronically connected to the control module (21) and is controlled by the control module (21) to scan the barcode on the tire pressure detector and interpret the barcode as the preset identification for the control module (21).

The power source (29) is electronically connected to the control module (21) and provides electrical power to the setting apparatus (20).

Figure 3:
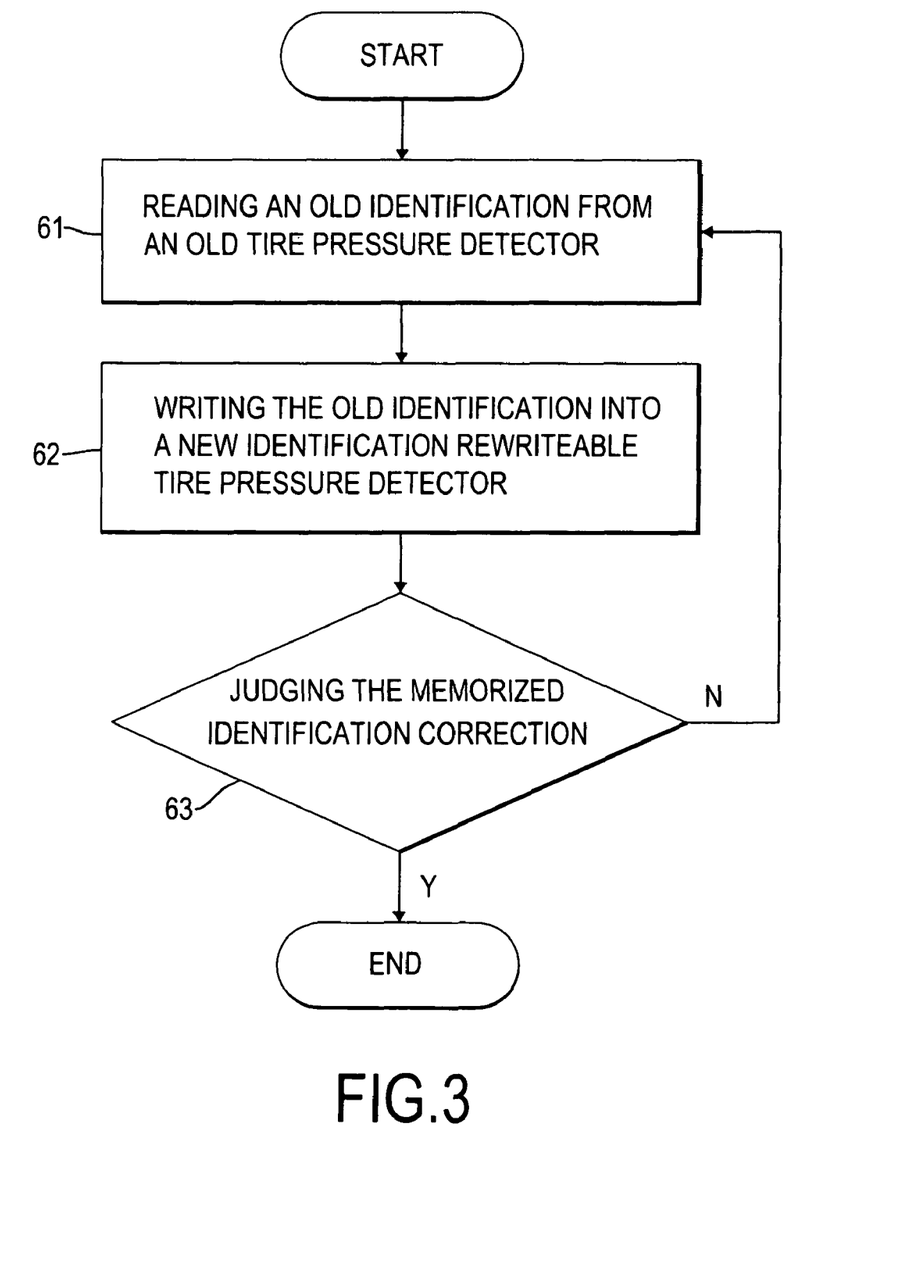
FIG. 3 is a flow chart of a tire pressure detector identification copying method in accordance with the present invention.

With reference to FIG. 3, a tire pressure detector identification copying method in accordance with the present invention has steps comprising: reading an old identification from an old tire pressure detector (61), writing the old identification into a new identification rewriteable tire pressure detector (62) and judging the memorized identification correction (63).

In the step of reading an old identification from an old tire pressure detector (61), a serviceman may use the setting apparatus (20) to receive the RF signal wirelessly from any old tire pressure detector or directly input the external identification (i.e. old identification) of the old tire pressure detector. If the old tire pressure detector is totally failed and can not transmit the RF signal, the serviceman may scan the barcode or input the external identification of old tire pressure detector directly through the input module (27).

In the step of writing the old identification into a new identification rewriteable tire pressure detector (62), after the external identification of the old tire pressure detector is acquired, the serviceman may rewrite the external identification into a new identification rewriteable tire pressure detector. If the new identification rewriteable tire pressure detector already has the preset identification therein, the external identification of the old tire pressure detector is overwrote the external identification.

In the step of judging the memorized identification correction (63), after the external identification of the old tire pressure detector has been memorized in the new identification rewriteable tire pressure detector, the serviceman may use the setting apparatus (20) to receive wireless signals from the new identification rewriteable tire pressure detector. The setting apparatus (20) judges the consistence of the identifications acquired from the old tire pressure detector and the new identification rewriteable tire pressure. When the identifications is not consistence, the setting apparatus performs the step of writing the old identification into a new identification rewriteable tire pressure detector (62) again.

As described above, a car user may easily replace a failed tire pressure detector with one identification rewriteable tire pressure detector (10) by few steps as described above. No more complicate sequence is needed to reset or introduce a new identification of a new tire pressure detector to a monitoring system installed inside the car.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:
1. A tire pressure detecting apparatus comprising:
  an identification rewritable tire pressure detector comprising:
    a micro-processing module having a rewritable memory unit being capable of recording an identification;
    a sensing module electrically connected to the micro-processing module and having a pressure-detecting unit, the pressure-detecting unit detecting a tire pressure and sending a detection result to the micro-processing module;

a transmitting module controlled by the micro-processing module to transmit a radio frequency (RF) signal comprising the detection result and an identification of the identification rewritable tire pressure detector;

a power module electronically connected to the micro-processing module and providing electric power to the identification rewriteable tire pressure detector; and a receiving interface electronically connected to the micro-processing module, receiving and sending an external signal to the micro-processing module, where the external signal comprises an external identification to be written into the rewriteable memory unit; and a setting apparatus communicating with the identification rewriteable tire pressure detector and having a control module;

an input module being electronically connected to the control module and allowing an operator to input an identification to be written into the identification rewriteable tire pressure;

a receiving module electronically connected to the control module, receiving the RF signal from the identification rewriteable tire pressure detector or a tire pressure detector and sending the RF signal to the control module;

a setting output module controlled by the control module to send the external signal to the receiving interface, where the external signal is generated by the control module and comprises the identification that is provided by the input module or provided by the RF signal received from the receiving module; and a power source electronically connected to the control module and providing electrical power to the setting apparatus.

2. The tire pressure detecting apparatus as claimed in claim 1, wherein
the receiving interface is a connector; and
the setting output module is an outputting connector corresponding and being electronically connected to the receiving interface and sends the external signal to the receiving interface.

3. The tire pressure detecting apparatus as claimed in claim 1, wherein
the receiving interface is a low frequency receiver and receives the external signal wirelessly; and
the setting output module is a wireless transmitting interface sending the external signal wirelessly to the receiving interface.

4. The tire pressure detecting apparatus as claimed in claim 1, wherein the input module is a dip switch.

5. The tire pressure detecting apparatus as claimed in claim 1, wherein the sensing module further has at least one acceleration-detecting unit and a temperature-detecting unit.

6. The tire pressure detecting apparatus as claimed in claim 2, wherein the sensing module further has at least one acceleration-detecting unit and a temperature-detecting unit.

7. The tire pressure detecting apparatus as claimed in claim 3, wherein the sensing module further has at least one acceleration-detecting unit and a temperature-detecting unit.

8. The tire pressure detecting apparatus as claimed in claim 1, wherein the input module is a code scanner.

9. The tire pressure detecting apparatus as claimed in claim 1, wherein the input module is a keyboard.

10. A tire pressure detector identification copying method comprising steps of;
providing a setting apparatus;
reading an old identification from an old tire pressure detector by the setting apparatus and storing the old identification in the setting apparatus; and
wirelessly writing the old identification into a new identification rewriteable tire pressure detector by the setting apparatus.

11. The method as claimed in claim 10, further comprising a step of;
verifying the identification newly recorded in the new identification rewriteable tire pressure detector.

12. The method as claimed in claim 10, wherein the setting apparatus receives a wireless signal containing the old identification from the old tire pressure detector in the step of reading the old identification.

13. The method as claimed in claim 10, wherein the setting apparatus receives the old identification through an input module in the step of reading the old identification.

* * * * *

(12) EX PARTE REEXAMINATION CERTIFICATE (9926th)
United States Patent
Yu (10) Number: US 8,031,064 C1
(45) Certificate Issued: Nov. 7, 2013

(54) TIRE PRESSURE DETECTING APPARATUS AND TIRE PRESSURE DETECTOR IDENTIFICATION COPYING METHOD FOR THE SAME

(75) Inventor: Hung-Chih Yu, Taichung (TW)

(73) Assignee: Orange Electronic Co., Ltd., Tanzih Hsiang, Taichung Hsien (TW)

Reexamination Request:
No. 90/012,430, Aug. 10, 2012

Reexamination Certificate for:
Patent No.: 8,031,064
Issued: Oct. 4, 2011
Appl. No.: 12/283,979
Filed: Sep. 17, 2008

(51) Int. Cl.
*B60C 23/00* (2006.01)

(52) U.S. Cl.
USPC ............. 340/447; 340/442; 340/445; 73/146; 73/146.5

(58) Field of Classification Search
None
See application file for complete search history.

(56) References Cited

To view the complete listing of prior art documents cited during the proceeding for Reexamination Control Number 90/012,430, please refer to the USPTO's public Patent Application Information Retrieval (PAIR) system under the Display References tab.

*Primary Examiner* — Hetul Patel (57) ABSTRACT

A tire pressure detecting apparatus has an identification rewriteable tire pressure detector and a setting apparatus. The tire pressure detector is securely mounted on a valve stem inside a tire of a vehicle and has a micro-processing module, a sensing module, a transmitting module and a receiving interface, where the micro-processing module has a memory unit. The setting apparatus is capable of reading or inputting an identification from a failure tire pressure detector, transmits the identification to the identification rewriteable tire pressure detector and writes the identification into the memory unit.

US 8,031,064 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8 and 10-13 is confirmed.

Claims 1-7 and 9 are cancelled.

New claims 14 and 15 are added and determined to be patentable.

14. *A tire pressure detecting system, comprising:*
   *an identification rewritable tire detector comprising:*
      *a micro-processing module having a rewritable memory unit to record an identification;*
      *a sensing module electrically connected to the micro-processing module and having a pressure-detecting unit to detect a tire pressure and send a detection result to the micro-processing module;*
      *a transmitting module controlled by the micro-processing module to transmit a radio frequency (RF) signal including the detection result and the identification of the identification rewritable tire pressure detector;*
      *a power module electronically connected to the micro-processing module to supply power to the identification rewriteable tire pressure detector; and*
      *an interface arranged to receive and send an external signal to the micro-processing module, where the external signal comprises an external identification to be written into the rewriteable memory unit; and*
   *a setting apparatus arranged to communicate with the identification rewriteable tire pressure detector, via wireless, including:*
      *reading an old identification from an old tire pressure detector by the setting apparatus and storing the old identification in the setting apparatus; and*
      *wirelessly writing the old identification into a new identification rewriteable tire pressure detector by the setting apparatus,*
   *wherein the setting apparatus comprises:*
      *a control module;*
      *an input module connected to the control module to enable an operator to input an identification to be written into the identification rewriteable tire pressure detector;*
      *a receiving module connected to the control module to receive the RF signal from the identification rewriteable tire pressure detector and to send the RF signal to the control module;*
      *a setting output module controlled by the control module to send the external signal to the identification rewriteable tire pressure detector, via the interface, where the external signal comprises the identification that is provided by the input module or provided by the RF signal received from the receiving module; and*
      *a power source connected to the control module to supply power to the setting apparatus.*

15. *A tire pressure detecting system comprising:*
   *an identification rewritable tire pressure detector comprising:*
      *a micro-processing module having a rewritable memory unit to record an identification;*
      *a sensing module electrically connected to the micro-processing module and having a pressure-detecting unit to detect a tire pressure and send a detection result to the micro-processing module;*
      *a transmitting module controlled by the micro-processing module to transmit a radio frequency (RF) signal including the detection result and the identification of the identification rewritable tire pressure detector;*
      *a power module electronically connected to the micro-processing module to supply power to the identification rewriteable tire pressure detector;*
      *an interface arranged to receive and send an external signal to the micro-processing module, where the external signal comprises an external identification to be written into the rewriteable memory unit; and*
   *a setting apparatus arranged to communicate with the identification rewriteable tire pressure detector, including:*
      *reading an old identification from an old tire pressure detector by the setting apparatus and storing the old identification in the setting apparatus; and*
      *writing the old identification into a new identification rewriteable tire pressure detector by the setting apparatus,*
   *wherein the setting apparatus comprises:*
      *a control module;*
      *an input module connected to the control module to enable an operator to input an identification to be written into the identification rewriteable tire pressure detector;*
      *a receiving module connected to the control module to receive the RF signal from the identification rewriteable tire pressure detector and to send the RF signal to the control module;*
      *a setting output module controlled by the control module to send the external signal to the identification rewriteable tire pressure detector, via the interface, where the external signal comprises the identification that is provided by the input module or provided by the RF signal received from the receiving module; and*
      *a power source connected to the control module to supply power to the setting apparatus.*

\* \* \* \* \*

(12) EX PARTE REEXAMINATION CERTIFICATE (10436th)
United States Patent
Yu (10) Number: US 8,031,064 C2
(45) Certificate Issued: Dec. 12, 2014

(54) TIRE PRESSURE DETECTING APPARATUS AND TIRE PRESSURE DETECTOR IDENTIFICATION COPYING METHOD FOR THE SAME

(75) Inventor: Hung-Chih Yu, Taichung (TW)

(73) Assignee: Orange Electronic Co., Ltd., Tanzih Hsiang, Taichung Hsien (TW)

Reexamination Request:
No. 90/013,169, Feb. 28, 2014

Reexamination Certificate for:
Patent No.: 8,031,064
Issued: Oct. 4, 2011
Appl. No.: 12/283,979
Filed: Sep. 17, 2008

Reexamination Certificate C1 8,031,064 issued Nov. 7, 2013

(51) Int. Cl.
*B60C 23/00* (2006.01)

(52) U.S. Cl.
USPC ............. 340/447; 340/442; 340/445; 73/146; 73/146.5

(58) Field of Classification Search
None
See application file for complete search history.

(56) References Cited

To view the complete listing of prior art documents cited during the proceeding for Reexamination Control Number 90/013,169, please refer to the USPTO's public Patent Application Information Retrieval (PAIR) system under the Display References tab.

*Primary Examiner* — Linh M Nguyen (57) ABSTRACT

A tire pressure detecting apparatus has an identification rewriteable tire pressure detector and a setting apparatus. The tire pressure detector is securely mounted on a valve stem inside a tire of a vehicle and has a micro-processing module, a sensing module, a transmitting module and a receiving interface, where the micro-processing module has a memory unit. The setting apparatus is capable of reading or inputting an identification from a failure tire pressure detector, transmits the identification to the identification rewriteable tire pressure detector and writes the identification into the memory unit.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-7 and 9 were previously cancelled.

Claims 8 and 10-15 are cancelled.

New claims 16-25 are added and determined to be patentable.

16. *A tire pressure detecting system, comprising:*
   *an identification rewritable tire pressure detector comprising:*
      *a micro-processing module having a rewritable memory unit to record an identification;*
      *a sensing module electrically connected to the micro-processing module and having a pressure-detecting unit to detect a tire pressure and send a detection result to the micro-processing module;*
      *a transmitting module controlled by the micro-processing module to transmit a radio frequency (RF) signal, wherein the RF signal comprises the detection result and the identification of the identification rewritable tire pressure detector;*
      *a power module electronically connected to the micro-processing module to supply power to the identification rewriteable tire pressure detector; and*
      *an interface arranged to receive an external signal and send the external signal to the micro-processing module, wherein the external signal comprises an external identification to be written into the rewriteable memory unit or to be used to overwrite a preset identification in the rewriteable memory unit; and*
   *a portable setting apparatus arranged to communicate with the identification rewriteable tire pressure detector, comprising:*
      *a control module;*
      *an input module connected to the control module to enable an operator to manually input an identification to be written into the identification rewriteable tire pressure detector:*
      *a receiving module connected to the control module to receive the RF signal from the identification rewriteable tire pressure detector or a tire pressure detector and to send the RF signal to the control module;*
      *a setting output module controlled by the control module to send the external signal to the interface of the identification rewriteable tire pressure detector, wherein the external signal is generated by the control module and comprises the identification that is provided by the input module or provided by the RF signal received from the receiving module; and*
      *a power source connected to the control module to supply power to the setting apparatus;*
      *wherein the setting apparatus is configured to:*
         *obtain an update identification to be written into a new identification rewriteable tire pressure detector either by (1) receiving the RF signal from an old tire pressure detector by the receiving module, retrieving an old identification of the old tire pressure detector from the RF signal, and using the old identification as the update identification, or by (2) receiving a manual input of the identification from the input module, and using the identification as the update identification;*
         *store the update identification in the setting apparatus; and*
         *generate the external signal comprising the update identification as the external identification, and send the external signal to the new identification rewriteable tire pressure detector such that the new identification rewriteable tire pressure detector records the update identification in the rewritable memory unit or overwrites the preset identification in the rewritable memory unit by the update identification.*

17. *The tire pressure detecting apparatus as claimed in claim 16, wherein the input module comprises a code scanner.*

18. *A tire pressure detecting system, comprising:*
   *an identification rewritable tire pressure detector comprising:*
      *a micro-processing module having a rewritable memory unit to record an identification;*
      *a sensing module electrically connected to the micro-processing module and having a pressure-detecting unit to detect a tire pressure and send a detection result to the micro-processing module;*
      *a transmitting module controlled by the micro-processing module to transmit a radio frequency (RR) signal, wherein the RR signal comprises the detection result and the identification of the identification rewritable tire pressure detector;*
      *a power module electronically connected to the micro-processing module to supply power to the identification rewriteable tire pressure detector; and*
      *an interface arranged to receive an external signal and send the external signal to the micro-processing module, wherein the external signal comprises an external identification to be written into the rewriteable memory unit or to be used to overwrite a preset identification in the rewriteable memory unit; and*
   *a portable setting apparatus arranged to communicate with the identification rewriteable tire pressure detector, comprising:*
      *a control module;*
      *an input module connected to the control module to enable an operator to manually input an identification to be written into the identification rewriteable tire pressure detector:*
      *a receiving module connected to the control module to receive the RF signal from the identification rewriteable tire pressure detector or a tire pressure detector and to send the RF signal to the control module;*
      *a setting output module controlled by the control module to send the external signal to the interface of the identification rewriteable tire pressure detector, wherein the external signal is generated by the control module and comprises the identification that is provided by the input module or provided by the RF signal received from the receiving module; and*
      *a power source connected to the control module to supply power to the setting apparatus;* wherein the setting apparatus is configured to:
obtain an update identification to be written into a new identification rewriteable tire pressure detector, wherein the update identification is either (1) an old identification of an old tire pressure detector, obtained by receiving the RF signal from the old tire pressure detector by the receiving module and retrieving the old identification from the RF signal, or (2) the identification manually inputted and received from the input module; and
generate the external signal comprising the update identification as the external identification, and send the external signal to the new identification rewriteable tire pressure detector;
wherein the new identification rewriteable tire pressure detector is configured to:
acquire the update identification from the external signal;
when the rewritable memory unit has the preset identification stored therein, overwrite the preset identification in the rewritable memory unit by the update identification; and
when the rewritable memory unit does not have the preset identification stored therein, record the update identification in the rewritable memory unit.

19. The tire pressure detecting apparatus as claimed in claim 18, wherein the input module comprises a code scanner.

20. A tire pressure detector identification updating method comprising the steps of:
providing a setting apparatus, comprising an input module and a receiving module;
obtaining, by the setting apparatus, an update identification to be written into a new identification rewriteable tire pressure detector by either (1) reading an old identification from an old tire pressure detector by the receiving module of the setting apparatus by receiving radio frequency (RF) signal from the old tire pressure detector by the receiving module and retrieving the old identification of the old tire pressure detector from the RF signal, and storing the old identification in the setting apparatus for using the old identification as the update identification, or (2) receiving an input of a manually input identification from an input module of the setting apparatus, and using the manually input identification as the update identification;
when the update identification is the old identification from the old tire pressure detector, wirelessly writing the old identification into a new identification rewriteable tire pressure detector by the setting apparatus by generating an external signal comprising the old identification, and sending the external signal to the new identification rewriteable tire pressure detector, such that the new identification rewriteable tire pressure detector records the update identification in a rewritable memory unit or overwrites a preset identification in the rewritable memory unit by the update identification; and
when the update identification is the manually input identification from the input module, writing the manually input identification into the new identification rewriteable tire pressure detector by the setting apparatus by generating the external signal comprising the manually input identification, and sending the external signal to a new identification rewriteable tire pressure detector, such that the new identification rewriteable tire pressure detector records the update identification in the rewritable memory unit or overwrites the preset identification in the rewritable memory unit by the update identification.

21. The method as claimed in claim 20, wherein the new identification rewriteable tire pressure detector is configured to record the update identification in the rewritable memory unit or overwrite the preset identification in the rewritable memory unit by the update identification by:
acquiring the update identification from the external signal;
when the rewritable memory unit has the preset identification stored therein, overwrite the preset identification in the rewritable memory unit by the update identification; and
when the rewritable memory unit does not have the preset identification stored therein, record the update identification in the rewritable memory unit.

22. The method as claimed in claim 20, further comprising:
verifying the update identification newly recorded in the rewritable memory unit of the new identification rewriteable tire pressure detector.

23. The method as claimed in claim 22, wherein the verifying step comprises:
receiving, by the setting apparatus, a wireless signal from the new identification rewriteable tire pressure detector, wherein the wireless signal comprises the update identification newly recorded in the rewritable memory unit;
judging, by the setting apparatus, consistency of the update identification newly recorded in the rewritable memory unit and the old identification of the old tire pressure detector; and
if the update identification newly recorded in the rewritable memory unit is not consistent with the old identification of the old tire pressure detector, performing the generating step again.

24. The method as claimed in claim 20, wherein the setting apparatus is configured to receive the RF signal wirelessly.

25. The method as claimed in claim 20, wherein the input module comprises a code scanner.

* * * * *